US010974620B2

(12) United States Patent
Saitou et al.

(10) Patent No.: US 10,974,620 B2
(45) Date of Patent: Apr. 13, 2021

(54) OCCUPANT DETECTION SYSTEM AND OCCUPANT DETECTION DEVICE

(71) Applicant: DENSO CORPORATION, Kariya (JP)

(72) Inventors: Takashi Saitou, Nishio (JP); Koji Sakamoto, Kariya (JP); Takahisa Matsumoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 175 days.

(21) Appl. No.: 16/232,208

(22) Filed: Dec. 26, 2018

(65) Prior Publication Data

US 2019/0126779 A1 May 2, 2019

Related U.S. Application Data

(63) Continuation of application No. PCT/JP2017/018961, filed on May 22, 2017.

(30) Foreign Application Priority Data

Jun. 30, 2016 (JP) ............................ JP2016-129682

(51) Int. Cl.

| | |
|---|---|
| ***G01S 13/04*** | (2006.01) |
| ***B60N 2/00*** | (2006.01) |
| ***G01V 3/12*** | (2006.01) |
| ***B60R 21/015*** | (2006.01) |
| ***G01S 13/76*** | (2006.01) |
| ***G01S 13/00*** | (2006.01) |

(52) U.S. Cl.

CPC .......... *B60N 2/002* (2013.01); *B60R 21/0153* (2014.10); *G01S 13/003* (2013.01); *G01S 13/04* (2013.01); *G01S 13/765* (2013.01); *G01V 3/12* (2013.01)

(58) Field of Classification Search

CPC ... B60N 2/002; B60R 21/0153; G01S 13/003; G01S 13/04; G01S 13/765; G01V 3/12

See application file for complete search history.

(56) References Cited

U.S. PATENT DOCUMENTS

2002/0080014 A1* 6/2002 McCarthy ............. B60N 2/002 340/426.1
2018/0292521 A1 10/2018 Saitou et al.

FOREIGN PATENT DOCUMENTS

JP H09228679 A 9/1997
WO WO-2017056858 A1 4/2017

* cited by examiner

*Primary Examiner* — Timothy A Brainard
(74) *Attorney, Agent, or Firm* — Harness, Dickey & Pierce, P.L.C.

(57) ABSTRACT

An occupant detection system includes a transmitter provided adjacent to a first side face of a vehicle before a predetermined seat and successively transmitting a radio wave over a range covering a seat door located on a second side face of the vehicle and in a same row as the predetermined seat, a receiver provided adjacent to the second side face behind the predetermined seat and receiving the radio wave transmitted from the transmitter, and an occupant detection device including a reception intensity acquirer, an occupant detector, an opening and closing detector. The reception intensity acquirer successively acquires a reception intensity of a radio wave successively received by the receiver. The occupant detector detects an occupant in the vehicle according to the reception intensity of the radio wave received by the receiver while the opening and closing detector detects that the seat door is open.

12 Claims, 9 Drawing Sheets

A
15
151 152
D
B
13
C
122
12
121
BODY ECU
COL ECU
14
10

OCCUPANT DETECTION SYSTEM AND OCCUPANT DETECTION DEVICE

CROSS REFERENCE TO RELATED APPLICATIONS

The present application is a continuation application of International Patent Application No. PCT/JP2017/018961 filed on May 22, 2017, which designated the United States and claims the benefit of priority from Japanese Patent Application No. 2016-129682 filed on Jun. 30, 2016. The entire disclosures of all of the above applications are incorporated herein by reference.

TECHNICAL FIELD

The present disclosure relates to an occupant detection system and an occupant detection device.

BACKGROUND

A technique of detecting an occupant in a compartment by using a radio wave is known.

SUMMARY

The present disclosure provides an occupant detection system and an occupant detection device that detect an occupant in a vehicle according to a reception intensity of a radio wave transmitted from a transmitter provided adjacent to a first side face of the vehicle before a predetermined seat and received by a receiver provided adjacent to a second side face of the vehicle behind the predetermined seat while detecting that a seat door located on the second side face and in a same row as the predetermined seat is open.

BRIEF DESCRIPTION OF THE DRAWINGS

Additional objects and advantages of the present disclosure will be more readily apparent from the following detailed description when taken together with the accompanying drawings. In the drawings.

DETAILED DESCRIPTION

Figure 1:
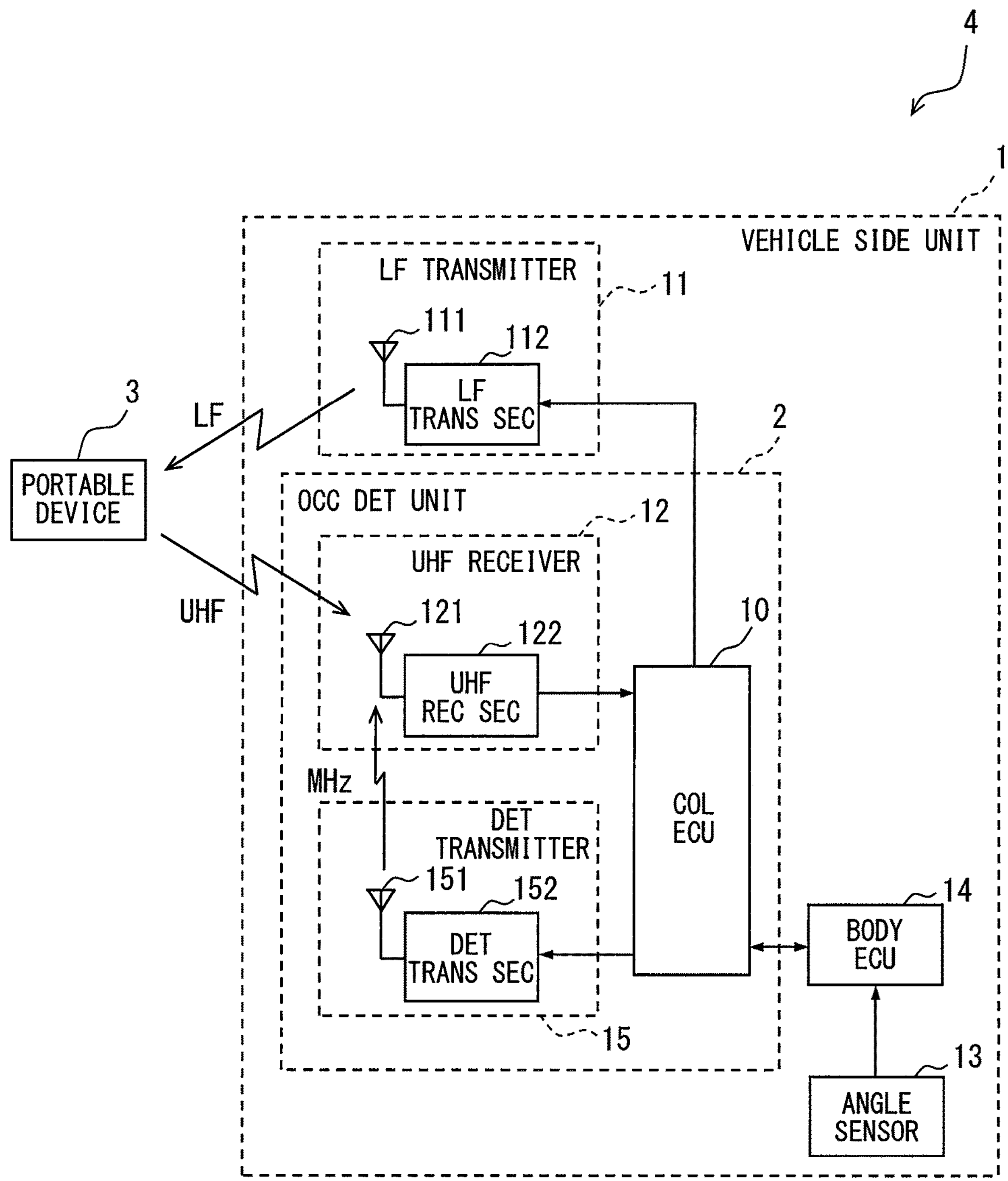
FIG. 1 is a view showing an example of a schematic configuration of a vehicular system according to a first embodiment of the present disclosure.

Before describing embodiments of the present disclosure, a comparative example and various aspects of the present disclosure will be described below.

In a comparative example, a radio wave at about 10 GHz is transmitted toward a vehicle in a parking lot, a reflection wave reflected inside a compartment is received by a device provided in the parking lot, and the presence or absence of an occupant in the compartment is detected according to the received reflection wave.

However, the comparative example has an issue that a circuit scale is increased by using a radio wave at a frequency as high as about 10 GHz. The comparative example uses a radio wave at a frequency as high as about 10 GHz with a purpose of increasing intensity of a reflection wave to detect the presence or absence of an occupant in the compartment according to intensity of a reflection wave reflected on a human body.

The presence or absence of an occupant in a compartment may also be detected by providing a transmitter and a receiver of a radio wave in the compartment so as to sandwich the occupant and by using a dielectric loss occurring when the radio wave passes through a human body. When configured as above, the presence or absence of an occupant in the compartment is detected according to the radio wave received through a human body. Hence, in comparison with a case where the presence or absence of an occupant in the compartment is detected according to the intensity of the reflection wave reflected directly on a human body, a radio wave at a lower frequency can be used, which can in turn reduce a circuit scale. In a case where the presence or absence of an occupant in the compartment is determined according to a radio wave received through a human body, it is preferable to dispose the transmitter and the receiver with a seat in between by placing one adjacent to a right or left side face of the vehicle before the seat and the other adjacent to the opposite side face behind the seat to make a detectable range as wide as possible.

However, even by using the transmitter and the receiver disposed as above, it is difficult to directly receive a radio wave transmitted from the transmitter and passed through an occupant by the receiver when an occupant is seated adjacent to a seat door (i.e., a door next to the seat in a same row), which raises an issue that a detection ratio is low for an occupant seated adjacent to the seat door.

According to an aspect of the present disclosure, an occupant detection system to be used in a vehicle includes a transmitter, a receiver, and an occupant detection device. The transmitter is to be provided adjacent to a first side face of the vehicle before a predetermined seat of the vehicle, and is configured to successively transmit a radio wave over a range covering a seat door located on a second side face of the vehicle and in a same row as the predetermined seat. The first side face is one of a right side face or a left side face of the vehicle, and the second side face is the other of the right side face or the left side face of the vehicle. The receiver is to be provided adjacent to the second side face behind the predetermined seat and is configured to successively receive the radio wave transmitted from the transmitter. The occupant detection device includes a reception intensity acquirer, an occupant detector, and an opening and closing detector. The reception intensity acquirer is configured to successively acquire a reception intensity of the radio wave successively received by the receiver. The occupant detector is configured to detect an occupant in the vehicle according to the reception intensity acquired by the reception intensity acquirer. The opening and closing detector is configured to detect opening and closing of the seat door. The occupant detector is configured to detect the occupant in the vehicle according to the reception intensity of the radio wave acquired by the reception intensity acquirer while the opening and closing detector detects that the seat door is open.

According to another aspect of the present disclosure, an occupant detection device to be used in a vehicle includes a transmission direction section, a reception intensity acquisition section, an opening and closing detection section, and an occupant detection section. The transmission direction section is configured to direct a transmitter provided adjacent to a first side face of the vehicle before a predetermined seat of the vehicle to successively transmit a radio wave to a seat door located on a second side face of the vehicle and in a same row as the predetermined seat. The first side face is one of a right side face or a left side face of the vehicle, and the second side face is the other of the right side face or the left side face of the vehicle. The reception intensity acquisition section is configured to successively acquire a reception intensity of the radio wave successively received by a receiver provided adjacent to the second side face behind the predetermined seat. The opening and closing detection section is configured to detect opening and closing of the seat door. The occupant detection section is configured to detect an occupant in the vehicle according to the reception intensity acquired by the reception intensity acquisition section. The occupant detection section is configured to detect the occupant in the vehicle according to the reception intensity of the radio wave acquired by the reception intensity acquisition section while the opening and closing detection section detects that the seat door is open.

According to another aspect of the present disclosure, an occupant detection device to be used in a vehicle includes an electronic control unit configured to direct a transmitter provided adjacent to a first side face of the vehicle before a predetermined seat of the vehicle to successively transmit a radio wave to a seat door located on a second side face of the vehicle and in a same row as the predetermined seat, the first side face being one of a right side face or a left side face of the vehicle, and the second side face being the other of the right side face or the left side face of the vehicle, successively acquire a reception intensity of the radio wave successively received by a receiver provided adjacent to the second side face behind the predetermined seat, detect opening and closing of the seat door, and detect an occupant in the vehicle according to the reception intensity of the radio wave acquired while detecting that the seat door is open.

According to the occupant detection system and the occupant detection device configured as above, the transmitter is to be provided adjacent to the first side face before the predetermined seat and the receiver is to be provided adjacent to the second side face, which is an opposite side to the first side face, behind the predetermined seat. The radio wave from the transmitter is transmitted over a range covering the seat door located on the second side face. Hence, in circumstances where an occupant is seated on the predetermined seat adjacent to the seat door, the radio wave passes through the occupant. When the seat door is open, the radio wave passing through the occupant is reflected on the seat door and indirectly arrives the receiver depending on how wide the seat door is opened. Meanwhile, an occupant in the vehicle is detected according to the reception intensity of the radio wave while detecting that the seat door is open. Hence, even in circumstances where an occupant is seated on the predetermined seat adjacent to the seat door, the presence or absence of an occupant in the compartment can be detected according to the radio wave received through a human body. Also, because the presence or absence of an occupant in the compartment is detected according to the radio wave received through a human body, a radio wave at a lower frequency can be used in comparison with a case where the presence or absence of an occupant in the compartment is detected according to intensity of a reflection wave reflected directly from a human body. A circuit scale can be therefore reduced. Consequently, an occupant seated adjacent to the seat door can be detected at a higher detection ratio without increasing a circuit scale.

Embodiments of the present disclosure will now be described with reference to the drawings. In respective embodiments below, portions having the same functions as portions described in any preceding embodiment with reference to the drawings will be labeled with the same reference numerals and a description may not be repeated for convenience of explanation. Descriptions in any preceding embodiment can be applied to the portions labeled with the same reference numerals.

First Embodiment

As is shown in FIG. 1, a vehicular system 4 includes a vehicle side unit 1 and a portable device 3 having a function of an electronic key. The vehicle side unit 1 is used in a vehicle and the portable device 3 is carried by a user of the vehicle.

The vehicular system 4 has a so-called smart function. The smart function means a function of performing a code collation between the vehicle side unit 1 and the portable device 3 by near field communication and permitting to lock or unlock vehicle doors and to start a running drive source when the code collation is successful. The running drive source may be either an engine or a running motor. In an example described in the following, the running drive source is an engine.

A schematic configuration of the vehicle side unit 1 will be described first with reference to FIG. 1. As is shown in FIG. 1, the vehicle side unit 1 includes a collation ECU (COL ECU) 10, an LF transmitter 11, a UHF receiver 12, an angle sensor 13, a body ECU 14, and a detection transmitter 15. In the vehicle side unit 1, the collation ECU 10, the UHF receiver 12, and the detection transmitter (DET TRANSMITTER) 15 together form an occupant detection unit (OCC DET UNIT) 2. The occupant detection unit 2 corresponds to an occupant detection system.

The LF transmitter 11 includes an LF transmitting antenna 111 and an LF transmitting section (LF TRANS SEC) 112. The LF transmitting antenna 111 includes door antennas provided in the vicinity of respective vehicle doors of a driver seat, a front passenger seat, and a rear seat, an internal antenna provided inside a compartment, an antenna outside trunk room provided in the vicinity of a trunk room. Hereinafter, vehicle doors include doors of the driver seat, the front passenger seat, and the rear seat, and the trunk room door. The vehicle doors except for the trunk room door will be referred to as seat doors. The LF transmitting section 112 transmits a request signal on a radio wave in an LF band via the LF transmitting antenna 111. The LF band is a frequency band having a range from 30 kHz to 300 kHz, for example. A range within which a signal can be transmitted on a radio wave in the LF band from the LF transmitting antenna 111 is a near field communication area where near field communication is available. A request signal is a signal requesting the portable device 3 to transmit an identification code of the portable device 3 for code collation.

The UHF receiver 12 includes a UHF receiving antenna 121 and a UHF receiving section (UHF REC SEC) 122. The UHF receiver 12 corresponds to a receiver. The UHF receiving antenna 121 receives a signal transmitted on a radio wave in a UHF band. The UHF band is a frequency band having a range from 300 MHz to 3 GHz, for example. The UHF receiving section 122 is capable of receiving both of a radio wave in the UHF band transmitted from the portable device 3 and a radio wave in a MHz band transmitted from the detection transmitter 15 via the UHF receiving antenna 121. The UHF receiving section 122 demodulates a received radio wave by using a predetermined method and outputs a demodulated reception signal to the collation ECU 10. The UHF receiving section 122 also detects reception intensity of a radio wave received at the UHF receiving antenna 121 and outputs a detection result to the collation ECU 10. The reception intensity can also be called received signal intensity. For example, the UHF receiving section 122 may have and use a known RSSI circuit to detect reception intensity.

The UHF receiver 12 receives a reply signal returned from the portable device 3 in response to the request signal. The reply signal contains the identification code of the portable device 3. Hence, the UHF receiver 12 corresponds to a receiver that receives a collation code in an electronic key system.

The angle sensor 13 outputs a signal corresponding to an opening angle of each of the seat doors among the vehicle doors to the body ECU 14. The angle sensor 13 may be provided to, for example, a hinge section of each of the seat doors to output a signal corresponding to an opening angle of each of the seat doors to the body ECU 14.

The body ECU 14 locks and unlocks the respective vehicle doors by outputting a drive signal that controls locking and unlocking of the respective vehicle doors to door lock motors provided to the respective vehicle doors. Touch sensors provided to outer door handles of the respective vehicle doors are connected to the body ECU 14 and detect touching on the outer door handles of the corresponding vehicle doors by the user. In addition, courtesy switches provided to the respective vehicle doors are connected to the body ECU 14 and the body ECU 14 acquires signals of the courtesy switches in response to opening and closing of the respective vehicle doors. The angle sensor 13 is also connected to the body ECU 14 and the body ECU 14 acquires the signal corresponding to the opening angle of each of the seat doors.

The detection transmitter 15 includes a detection transmitting antenna 151 and a detection transmitting section (DET TRANS SEC) 152. The detection transmitting section 152 transmits a signal on a radio wave in the MHz band via the detection transmitting antenna 151. For the UHF receiver 12 to receive a radio wave in the MHz band transmitted from the detection transmitter 15, a radio wave in the MHz band transmitted from the detection transmitter 15 is preferably a radio wave in a frequency band higher than 300 MHz and lower than 1 GHz which is within the UHF band. Hereinafter, a radio wave transmitted from the detection transmitter 15 will be referred to as a detection radio wave. The detection transmitter 15 corresponds to a transmitter.

The collation ECU 10 includes a CPU, a volatile memory, a non-volatile memory, an input-output, and a bus interconnecting the foregoing components and performs various types of processing by running a control program stored in the non-volatile memory. The collation ECU 10 corresponds to an occupant detection device. The collation ECU 10 performs processing related to the smart function and processing related to a detection of an occupant in the compartment (hereinafter, referred to as occupant detection related processing).

For example, as the processing related to the smart function, the collation ECU 10 controls the LF transmitter 11 to transmit the request signal and performs a collation of the identification code contained in the reply signal when the reply signal is received by the UHF receiver 12 in response to the request signal. The processing related to a detection of an occupant in the compartment will be described in detail below. Functions performed by the collation ECU 10, either in part or in whole, may be provided by hardware, such as one or more than one IC.

Figure 2:
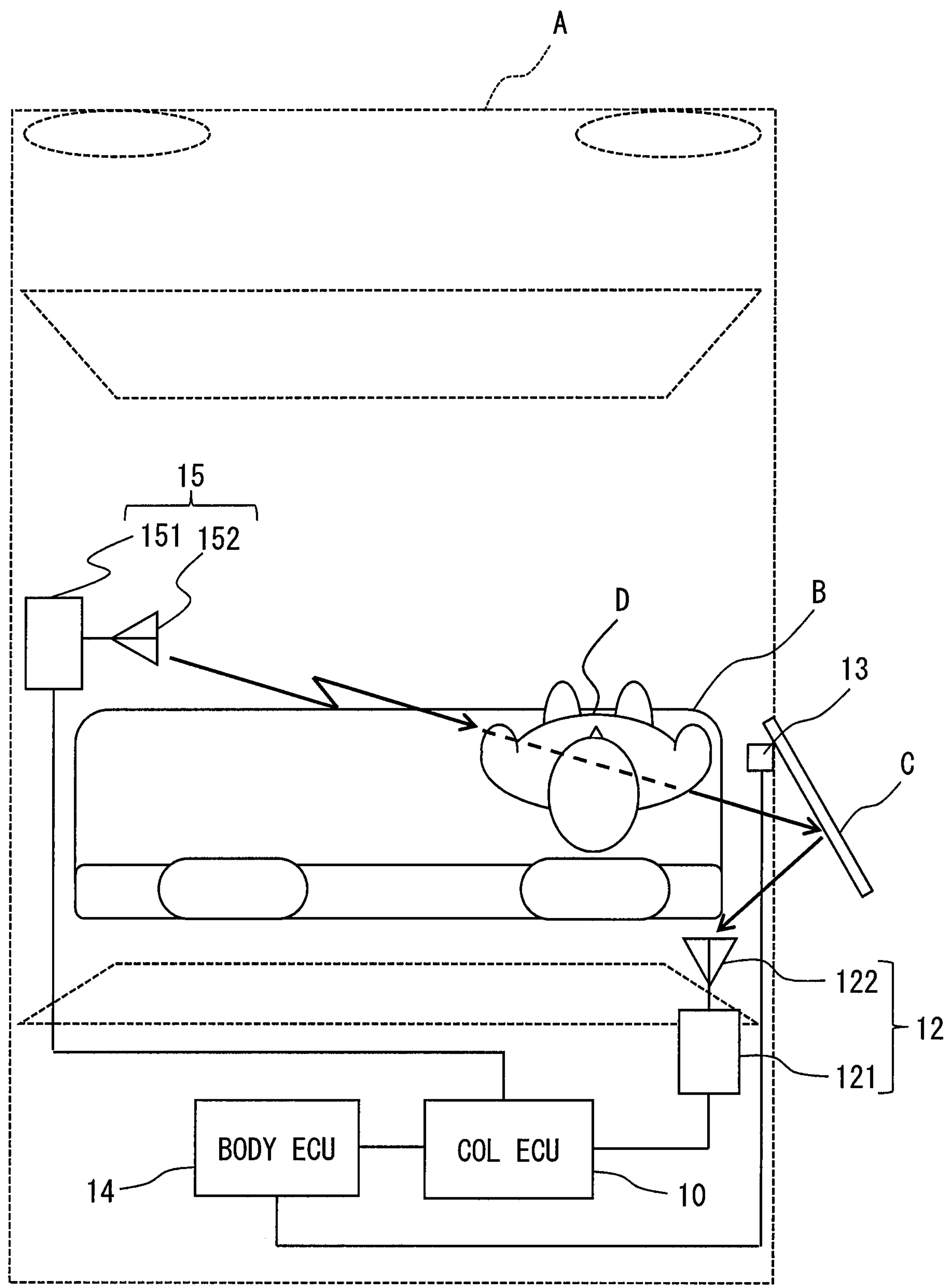
FIG. 2 is a view showing an example of locations of a detection transmitter and a UHF receiver of the first embodiment.

Locations of the detection transmitter 15 and the UHF receiver 12 will now be described with reference to FIG. 2. An example described in the present embodiment is a configuration to detect an occupant seated on the rear seat in the vehicle, in particular, a configuration to enable a detection of an occupant seated adjacent to a right seat door of the rear seat (hereinafter, referred to as a right rear seat door). In FIG. 2, a capital A indicates the vehicle, a capital B indicates the rear seat, a capital C indicates the right rear seat door, and a capital D indicates an occupant.

As is shown in FIG. 2, the detection transmitter 15 is provided adjacent to a left side face of the vehicle A before the rear seat B in the compartment of the vehicle A, in other words, near a B-pillar adjacent to the left side face in the compartment of the vehicle A. For example, the detection transmitter 15 may be provided on a floor adjacent to the left side face between the rear seat B and the front passenger seat. The detection transmitting antenna 151 of the detection transmitter 15 is provided at least at the location described above. The rear seat corresponds to a predetermined seat.

The detection transmitter 15 is provided to transmit a detection radio wave over a range covering the right rear seat door C. The phrase "a range covering the right rear seat door C" means a range covering the right rear seat door C opened to an extent that a detection radio wave reflected on the right rear seat door C is receivable by the UHF receiver 12. Hence, even in circumstance where the occupant D is seated on the rear seat B adjacent to the right side face, a detection radio wave passing through the occupant D is reflected on the right rear seat door C when the right rear seat door C is open. The detection radio wave is thus received indirectly by the UHF receiver 12.

It is preferable that the detection ratio wave transmitted from the detection transmitter 15 has a spread in directivity above a certain level, and the detection radio wave transmitted from the detection transmitter 15 is also directly receivable by the UHF receiver 12. When configured as above, in circumstances where the occupant D is seated adjacent to a center of the rear seat B, the detection radio wave passing through the occupant D is directly received by the UHF receiver 12. As is shown in FIG. 2, the UHF receiver 12 is provided adjacent to the right side face of the vehicle A behind the rear seat B in the compartment of the vehicle A, in other words, near a C-pillar adjacent to the right side face in the compartment of the vehicle A. For example, the UHF receiver 12 may be provided to the C-pillar adjacent to the right side face. The UHF receiving antenna 121 of the UHF receiver 12 is provided at least at the location described above. The angle sensor 13 outputs a signal corresponding to an opening angle of the right rear seat door to the body ECU 14.

Figure 3:
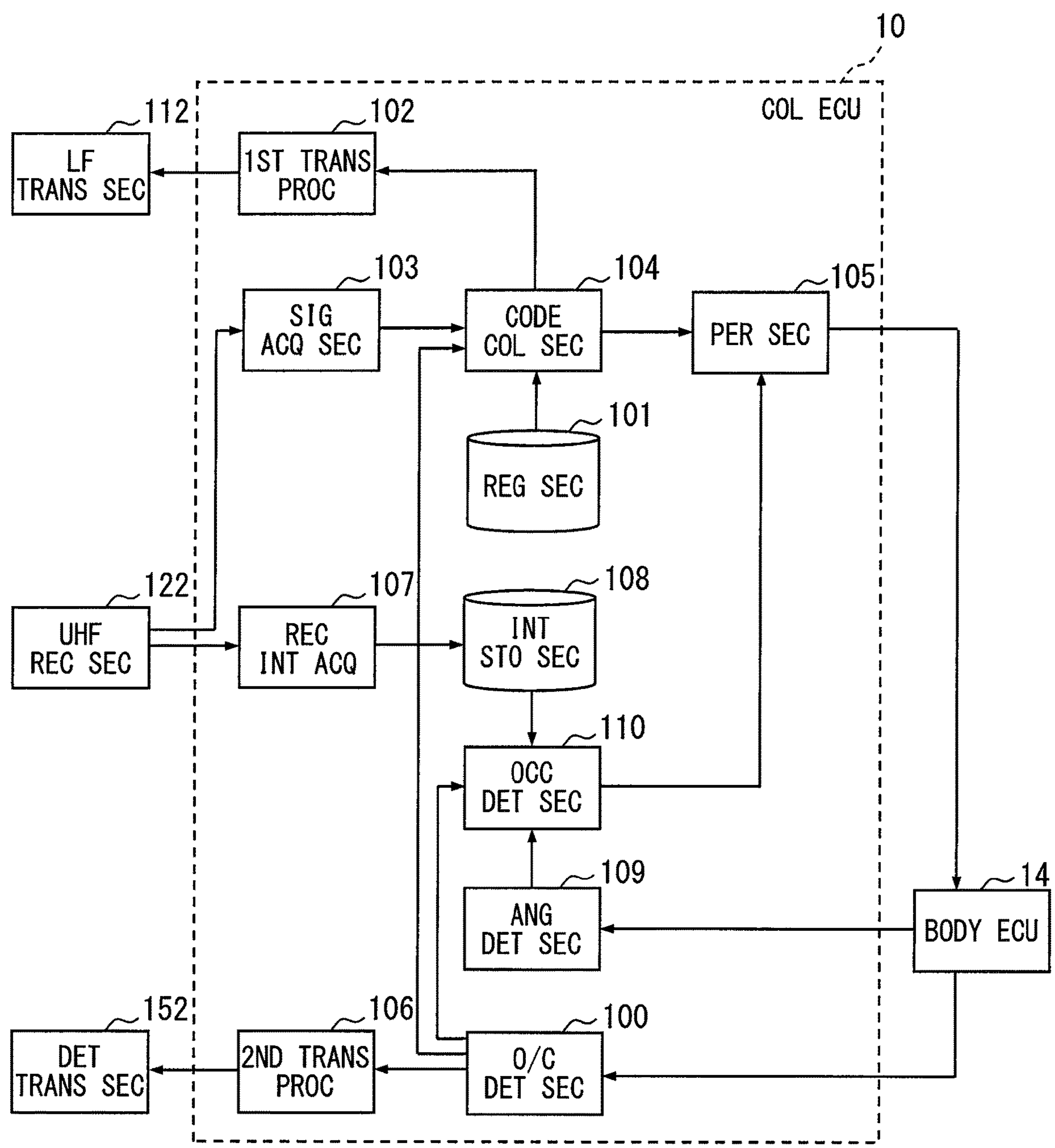
FIG. 3 is a view showing an example of a schematic configuration of a collation ECU.

A schematic configuration of the collation ECU 10 will now be described with reference to FIG. 3. As is shown in FIG. 3, the collation ECU (COL ECU) 10 includes an opening and closing detection section (O/C DET SEC) 100, a registration section (REG SEC) 101, a first transmission processing section (1ST TRANS PROC) 102, a signal acquisition section (SIG ACQ SEC) 103, a code collation section (CODE COL SEC) 104, a permission section (PER SEC) 105, a second transmission processing section (2ND TRANS PROC) 106, a reception intensity acquisition section (REC INT ACQ) 107, an intensity storage section (INT STO SEC) 108, an angle detection section (ANG DET SEC) 109, and an occupant detection section (OCC DET SEC) 110. The reception intensity acquisition section 107 corresponds to a reception intensity acquirer. The occupant detection section 110 corresponds to an occupant detector. The opening and closing detection section 100 corresponds to an opening and closing detector. The angle detection section 109 corresponds to an angle detector.

The opening and closing detection section 100 detects opening and closing of the vehicle doors from signals outputted from the courtesy switches and acquired from the body ECU 14. The opening and closing detection section 100 is capable of detecting opening and closing of the vehicle doors while distinguishing each vehicle door from the others depending on from which vehicle door a signal of the courtesy switch is outputted. The registration section 101 is, for example, an electrically rewritable non-volatile memory, in which an identification code assigned to identify the portable device 3 (hereinafter, referred to as a portable device identification code) owned by an authorized user is registered.

The first transmission processing section 102 has a request signal (hereinafter, referred to as a WAKE signal) transmitted from the LF transmitting antenna 111 to cancel a sleep state of the portable device 3. In response to the WAKE signal, the portable device 3 transmits a reply signal (hereinafter, referred to as a WAKE reply signal) on a radio wave in the UHF band, which is acquired by the signal acquisition section 103 via the UHF receiving section 122.

When the signal acquisition section 103 acquires the WAKE reply signal, the first transmission processing section 102 controls the LF transmitting antenna 111 via the LF transmitting section 112 to transmit a request signal (hereinafter, referred to as a demand signal) that contains an identification code identifying a vehicle (hereinafter, referred to as a vehicle identification code). The vehicle identification code may be a device ID assigned to the collation ECU 10 installed to the vehicle or a vehicle ID assigned to the vehicle.

The code collation section 104 determines whether the portable device 3 which has transmitted a demand reply signal acquired by the signal acquisition section 103 is the portable device 3 carried by the authorized user by performing the code collation, and outputs the collation result to the permission section 105. The code collation is performed between the portable device identification code contained in the demand reply signal transmitted from the portable device 3 and the portable device identification code registered in the registration section 101. In a case where the collation result acquired from the code collation section 104 indicates that the code collation is successful, the permission section 105 transmits a signal permitting to lock or unlock the respective vehicle doors to the body ECU 14.

When unlocking of the respective vehicle doors is permitted, the body ECU 14 starts to energize the touch sensors provided to the outer door handles of the respective vehicle doors and changes into a stand-by state in which a door handle operation by the user is detectable. When the body ECU 14 detects touching on any one of the touch sensors by the user, the body ECU 14 unlocks the respective vehicle doors by outputting a drive signal to the respective door lock motors. In another example of the present embodiment, when locking of the respective vehicle doors is permitted, the body ECU 14 automatically locks the respective vehicle doors by outputting a drive signal to the respective door lock motors.

The second transmission processing section 106 transmits an instruction to the detection transmitting section 152 to transmit a detection radio wave from the detection transmitter 15. The detection transmitter 15 may successively transmit a detection radio wave at predetermined intervals, for example, in every 100 milliseconds. The second transmission processing section 106 corresponds to a transmission direction section.

The reception intensity acquisition section 107 successively acquires reception intensity of a radio wave successively detected by the UHF receiving section 122 each time a radio wave is received at the UHF receiving antenna 121. The reception intensity acquisition section 107 may acquire reception intensity only in a limited time while the second transmission processing section 106 is transmitting a detection radio wave. The reception intensity acquisition section 107 stores successively acquired reception intensity into the intensity storage section 108 in time series. The intensity storage section 108 is, for example, a volatile memory.

The angle detection section 109 successively acquires a signal corresponding to an opening angle of the right rear seat door via the body ECU 14 and successively detects the opening angle of the right rear seat door from the acquired signal. Alternatively, the angle detection section 109 may successively detect the opening angle of the right rear seat door each time the ECU 14 acquires the opening angle of the right rear seat door successively detected from the signal outputted from the angle sensor 13.

The occupant detection section 110 detects an occupant in the vehicle according to reception intensity of the detection radio wave received by the UHF receiver 12. In the example of the present embodiment, an occupant seated adjacent to the center of the rear seat is detected according to the reception intensity of the detection radio wave received by the UHF receiver 12 while the opening and closing detection section 100 does not detect that the right rear seat door is open. In addition, an occupant seated adjacent to the right rear seat door or an occupant seated adjacent to the center of the rear seat or both are detected according to the reception intensity of the detection radio wave received by the UHF receiver 12 while the opening and closing detection section 100 detects that the right rear seat door is open. In the example of the present embodiment, the occupant detection section 110 reads out time-series data of the reception intensity acquired by the reception intensity acquisition section 107 while the opening angle of the right rear seat door detected by the angle detection section 109 is within a predetermined angle and is decreasing. Then, the occupant detection section 110 detects an occupant seated adjacent to the right rear seat door or an occupant seated adjacent to the center of the rear seat or both according to the read time-series data.

The predetermined angle can be set to any angle at which at least the detection radio wave passing through an occupant seated adjacent to the seat door is reflected on the seat door and is received by the UHF receiver 12, and is preferably set to, for example, 30 degrees. The following will describe a case where the predetermined angle is 30 degrees. The occupant detection section 110 may identify the reception intensity acquired by the reception intensity acquisition section 107 while the opening angle of the right rear seat door is within the predetermined angle and is decreasing according to, for example, a timestamp specifying a detection time of the opening angle and a timestamp specifying a detection time of the reception intensity.

In a case where a change amount of the reception intensity is less than or equal to a threshold in the time-series data of the reception intensity read out from the intensity storage section 108, the occupant detection section 110 detects an occupant seated adjacent to the right rear seat door or an occupant seated adjacent to the center of the rear seat or both. Meanwhile, in a case where the change amount of the reception intensity is above the threshold, the occupant detection section 110 detects neither an occupant seated adjacent to the right rear seat door nor an occupant seated adjacent to the center of the rear seat. The change amount may be an amount of change in the reception intensity until the reception intensity in the time-series data increases to a maximum. The threshold can be set to any value by which at least a change amount of the reception intensity when the detection radio wave passes through a human body and a change amount of the reception intensity when the detection radio wave does not pass through a human body can be distinguished from each other.

Figure 4:
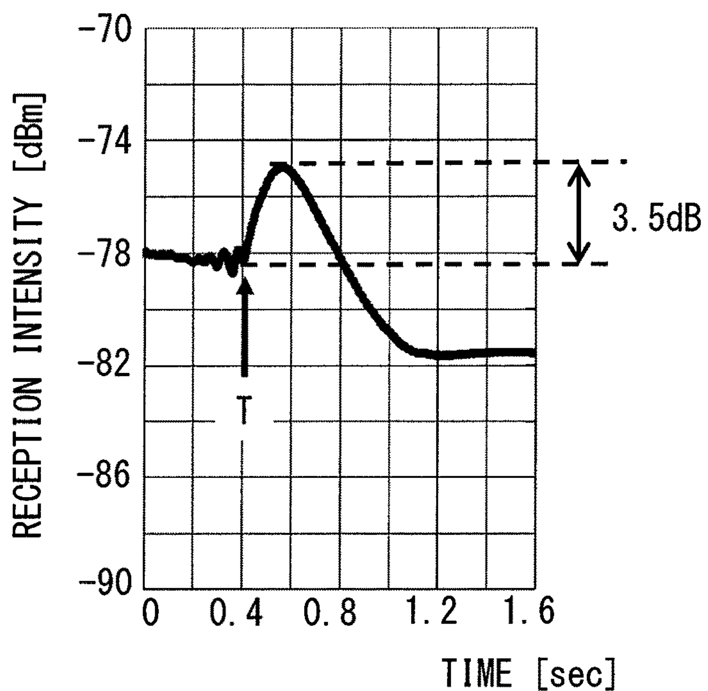
FIG. 4 is a view showing an example of a change amount of a reception intensity in a case where a detection radio wave does not pass through a human body.
Figure 5:
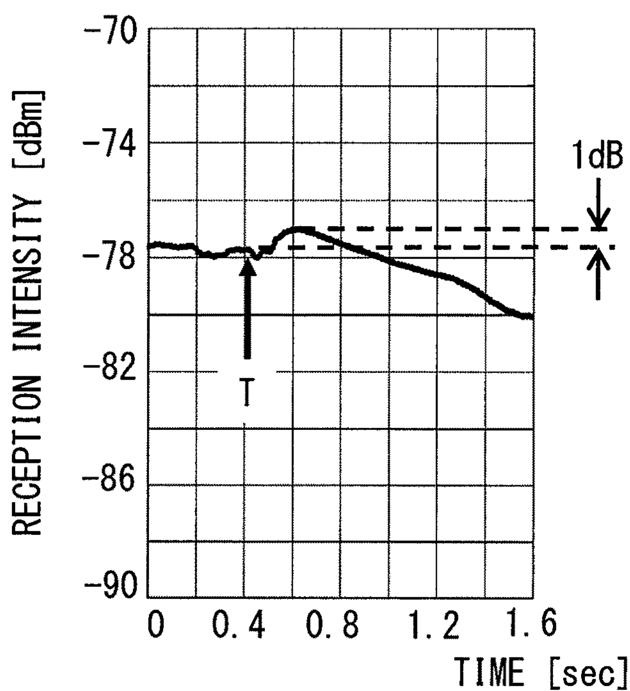
FIG. 5 is a view showing an example of a change amount of a reception intensity in a case where a detection radio wave passes through a human body.

The following will describe examples of the change amount of the reception intensity when the detection radio wave passes through a human body and the change amount of the reception intensity when a detection radio wave does not pass through a human body with reference to FIG. 4 and FIG. 5. In FIG. 4 and FIG. 5, an ordinate represents the reception intensity and an abscissa represents a time. In FIG. 4 and FIG. 5, a capital T represents a time when the right rear seat door is opened. FIG. 4 shows the change amount of the reception intensity when the detection radio wave does not pass through a human body and FIG. 5 shows the change amount of the reception intensity when the detection radio wave passes through a human body.

When the detection radio wave does not pass through a human body, the change amount of the reception intensity is approximately 3.5 dB as is shown in FIG. 4 whereas the change amount of the reception intensity is as small as approximately 1 dB when the detection radio wave passes through a human body as is shown in FIG. 5. As is understood from FIG. 4 and FIG. 5, the change amount of the reception intensity varies with whether the detection radio wave passes through a human body or not. Hence, an occupant can be detected according to the change amount of the reception intensity.

A detection result of the occupant detection section 110 is outputted to the permission section 105. Even when the code collation is successful, the permission section 105 does not permit to lock the respective vehicle doors in a case where an occupant seated on the rear seat is detected by the occupant detection section 110.

Processing related to the smart function performed by the collation ECU 10 when the user gets in the vehicle (hereinafter, referred to as smart related get-in processing) will now be described. The smart related get-in processing may be started when the signal acquisition section 103 acquires, for example, the WAKE reply signal in response to the WAKE demand signal.

In the smart related get-in processing, firstly, the first transmission processing section 102 instructs the LF transmitting section 112 to transmit the demand signal from the LF transmitting antenna 111. Subsequently, in a case where the signal acquisition section 103 acquires the demand reply signal returned from the portable device 3 in response to the transmitted demand signal, the code collation is performed between the portable device identification code contained in the acquired demand reply signal and the portable device identification code registered in the registration section 101. In a case where the code collation is successful, the permission section 105 transmits a signal permitting to unlock the respective vehicle doors to the body ECU 14. Unlocking of the respective vehicle doors is thus permitted. When the body ECU 14 detects touching on any one of the touch sensors provided to the respective outer door handles by the user while unlocking of the vehicle doors is permitted, the body ECU 14 drives the respective door lock motors and unlocks the respective vehicle doors.

Figure 6:
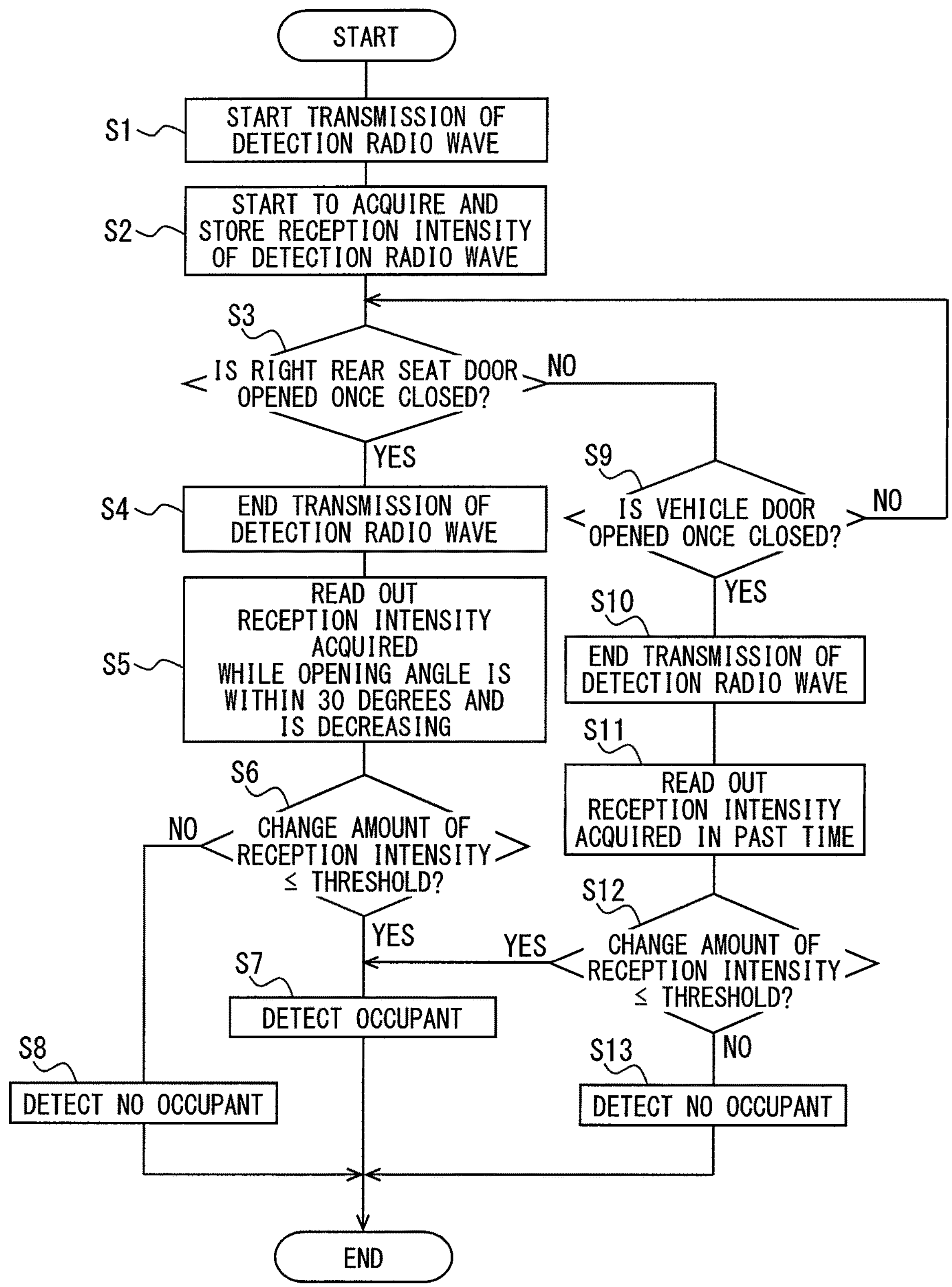
FIG. 6 is a flowchart showing an example of a flow of an occupant detection related processing performed by the collation ECU.

The occupant detection related processing performed by the collation ECU 10 will now be described with reference to a flowchart of FIG. 6. The flowchart of FIG. 6 may be started, for example, when an ignition power supply of the vehicle is turned off, and may be repeated at predetermined intervals, for example, in every 250 milliseconds until at least one vehicle door is opened.

Firstly at S1, the second transmission processing section 106 makes the detection transmitter 15 start transmission of a detection radio wave. At S2, the reception intensity acquisition section 107 starts to acquire reception intensity of a radio wave received at the UHF receiving antenna 121 and stores the acquired reception intensity into the intensity storage section 108 in time series. At S3, in a case where the opening and closing detection section 100 detects that the right rear seat door opened once is closed (YES at S3), advancement is made to S4. On the other hand, in a case where the opening and closing detection section 100 does not detect that the right rear seat door opened once is closed (NO at S3), advancement is made to S9. At S4, the transmission of the detection radio wave from the detection transmitter 15 is ended.

At S5, the occupant detection section 110 reads out the time-series data of the reception intensity acquired by the reception intensity acquisition section 107 from the intensity storage section 108 while the opening angle of the right rear seat door detected by the angle detection section 109 is within 30 degrees and is decreasing. At S6, the occupant detection section 110 determines whether the change amount of the reception intensity in the time-series data read out at S5 is equal to or less than the threshold. In a case where the change amount is equal to or less than the threshold (YES at S6), advancement is made to S7. Meanwhile, in a case where the change amount is greater than the threshold (NO at S6), advancement is made to S8.

At S7, the occupant detection section 110 detects an occupant seated on the rear seat in the vehicle. Subsequently, the occupant detection related processing is ended. Meanwhile, the occupant detection portion 110 detects no occupant seated on the rear seat in the vehicle at S8. Subsequently, the occupant detection related processing is ended.

In a case where the opening and closing detection section 100 detects at S9 that one of the vehicle doors opened once is closed (YES at S9), advancement is made to S10. On the other hand, in a case where the opening and closing detection section 100 does not detect that one of the vehicle doors opened once is closed (NO at S9), the flow returns to S3 to repeat the processing. The one of the vehicle doors may be limited to the driver seat door. At S10, the transmission of the detection radio wave from the detection transmitter 15 is ended.

At S11, the occupant detection section 110 reads out the time-series data of the reception intensity acquired by the reception intensity acquisition section 107 in a past time after the transmission of the detection radio wave is started at S1 until the transmission of the detection radio wave is ended at S10 from the intensity storage section 108. At S12, the occupant detection section 110 determines whether the change amount of the reception intensity in the time-series data read out at S11 is equal to or less than the threshold. In a case where the change amount is equal to or less than the threshold (YES at S12), advancement is made to S6. Meanwhile, in a case where the change amount is greater than the threshold (NO in S12), advancement is made to S13. At S13, the occupant detection section 110 detects no occupant seated on the rear seat in the vehicle. Subsequently, the occupant detection related processing is ended. Processing at S9 through S13 may be omitted and processing at S3 may be repeated instead when a determination made at S3 is NO.

Processing related to the smart function performed by the collation ECU 10 when the user gets out of the vehicle (hereinafter, referred to as smart related get-out processing) will now be described. The smart related get-out processing is started, for example, when the ignition power supply of the vehicle is turned off, and is repeated at predetermined intervals, for example, in every 250 milliseconds until the respective vehicle doors are locked.

In the smart related get-out processing, the first transmission processing section 102 controls the LF transmitting section 112*a* to transmit the demand signal from the LF transmitting antenna 111 in a case where the opening and closing detection section 100 detects that one of the vehicle doors opened once is closed. The one of the vehicle doors may be limited to the driver seat door.

Subsequently, in a case where the signal acquisition section 103 acquires the demand reply signal returned from the portable device 3 in response to the demand signal transmitted to an outside of the compartment, the code collation section 104 performs the code collation between the portable device identification code contained in the acquired demand reply signal and the portable device identification code registered in the registration section 101. The permission section 105 permits to lock the respective vehicle doors in a case where the code collation is successful and an occupant seated on the rear seat is not detected in the occupant detection related processing. Meanwhile, even when the code collation is successful, the permission section 105 does not permit to lock the respective vehicle doors in a case where an occupant seated on the rear seat is detected in the occupant detection related processing.

According to the configuration of the first embodiment, the detection transmitter 15 is provided adjacent to the left side face of the vehicle before the rear seat whereas the UHF receiver 12 is provided adjacent to the right side face of the vehicle behind the rear seat. Hence, in a case where an occupant is seated adjacent to the center of the rear seat (in other words, adjacent to a center of a vehicle width), a detection radio wave transmitted from the detection transmitter 15 passes through the occupant and is directly received by the UHF receiver 12. Because the presence or absence of an occupant is detected according to a dielectric loss of the detection radio wave occurring when the detection radio wave passes through the occupant, the occupant seated adjacent to the center of the rear seat can be detected.

In addition, the detection radio wave from the detection transmitter 15 is transmitted over a range covering the right rear seat door. Hence, the detection radio wave passes through an occupant in a case where the occupant is seated on the rear seat adjacent to the right rear seat door. When the right rear seat door is opened in such a state, the detection radio wave passing through the occupant is reflected on the right rear seat door and indirectly arrives the UHF receiver 12 depending on how wide the right rear seat door is opened. In other words, by using a new path of the detection radio wave created when the right rear seat door is opened, the detection radio wave passing through the occupant seated adjacent to the right rear seat door is received by the UHF receiver 12. Meanwhile, the occupant detection section 110 detects the occupant in the vehicle according to the reception intensity of the detection radio wave received by the UHF receiver 12 while the opening and closing detection section 100 detects that the right rear seat door is open. Hence, even in a case where an occupant is seated adjacent to the right rear seat door, the presence or absence of the occupant can be detected according to the dielectric loss of the detection radio wave occurring when the detection radio wave passes through the occupant.

The presence or absence of an occupant in the compartment is detected according to a radio wave received through a human body. Hence, in comparison with a case where the presence or absence of an occupant in the compartment is detected according to intensity of a reflection wave reflected directly from a human, a radio wave at a lower frequency can be used, and a circuit scale can be reduced. Consequently, not only an occupant seated adjacent to the center of the rear seat but also an occupant seated adjacent to the right rear seat door can be detected at a higher detection ratio without increasing a circuit scale.

According to the configuration of the first embodiment, when the right rear seat door is opened, processing is performed by using the time-series data of the reception intensity acquired in a limited time while the opening angle of the right rear seat door is within 30 degrees and is decreasing. Hence, in a case where an occupant is seated adjacent to the right rear seat door, the reception intensity of the detection radio wave passing through the occupant is used more reliably to detect the occupant. Hence, the occupant seated adjacent to the right rear seat door can be detected at a higher degree of accuracy.

As has been described in the occupant detection related processing and the smart related get-out processing, the transmission of the detection radio wave in the occupant detection related processing ends before the demand signal is transmitted in the smart related get-out processing. That is, the UHF receiver 12 is prevented from receiving the detection radio wave and the demand signal at a same time. The UHF receiver 12 can be thus used commonly in both of the occupant detection related processing and the smart related get-out processing. Hence, costs can be saved by eliminating a need to provide receivers separately for the occupant detection related processing and the smart related get-out processing.

Second Embodiment

The first embodiment above has described the configuration in which when the right rear seat door is opened, the processing is performed according to the time-series data of the reception intensity acquired in the limited time while the opening angle of the right rear seat door is within 30 degrees and is decreasing. It should be appreciated, however, that the present disclosure is not limited to the configuration as above. For example, as a second embodiment, it may be configured in such a manner that the occupant detection section 110 detects an occupant according to time-series data of the reception intensity acquired by the reception intensity acquisition section 107 from a start to an end of transmission of the detection radio wave even when the right rear seat door is opened.

As an example, the occupant detection section 110 may detect an occupant when the change amount of the reception intensity in the time-series data of the reception intensity acquired by the reception intensity acquisition section 107 after the right rear seat door is opened until the right rear seat door is closed is equal to or less than a threshold. In a case where the configuration of the second embodiment is adopted, the angle sensor 13 and the angle detection section 109 may be omitted from the vehicle side unit 1 and the collation ECU 10, respectively.

Third Embodiment

Besides the second embodiment above, as a third embodiment, it may be configured in such a manner that the occupant detection section 110 detects an occupant according to time-series data of the reception intensity acquired by the reception intensity acquisition section 107 from a predetermined time before the opening and closing detection section 100 detects that the right rear seat door opened once is closed.

As an example, the occupant detection section 110 may detect an occupant whether or not the change amount of the reception intensity in time-series data of the reception intensity acquired by the reception intensity acquisition section 107 from a predetermined time before the opening and closing detection section 100 detects that the right rear seat door opened once is closed is equal to or less than the threshold. The predetermined time can be set to any time long enough to assume that the opening angle of the right rear seat door had been in a range within which the detection radio wave passing through an occupant seated adjacent to the right rear seat door immediately before the right rear seat door is closed would have been reflected on the right rear seat door and received by a UHF receiver 12. For example, the predetermined time may be 0.25 second.

In a case where the configuration of the third embodiment is adopted, the occupant detection section 110 may identify the reception intensity acquired by the reception intensity acquisition section 107 from a predetermined time before the opening and closing detection section 100 detects that the right rear seat door opened once is closed according to a timestamp specifying a detection time of reception intensity. In a case where the configuration of the third embodiment is adopted, the angle sensor 13 and the angle detection section 109 may be also omitted from the vehicle side unit 1 and the collation ECU 10, respectively.

In a case where an occupant is seated adjacent to the right rear seat door, the reception intensity of the detection radio wave passing through the occupant is used more reliably to detect the occupant and hence the occupant seated adjacent to the right rear seat door can be detected at a higher degree of accuracy also by the configuration of the third embodiment.

Fourth Embodiment

The above-described embodiments have described the configuration in which the occupant detection section 110 detects an occupant when the change amount of the reception intensity in the time-series data of the reception intensity during an intended period is equal to or less than the threshold. It should be appreciated, however, that the present disclosure is not limited to the configuration as above. For example, as a fourth embodiment, it may be configured to detect an occupant when a change rate of the reception intensity in time-series data of the reception intensity during an intended period is equal to or less than a threshold. The following will describe an example of the configuration of the fourth embodiment. A vehicular system 4 of the fourth embodiment is same as the vehicular system 4 of the first embodiment above except that a collation ECU **10*a* is included instead of the collation ECU 10**.

Figure 7:
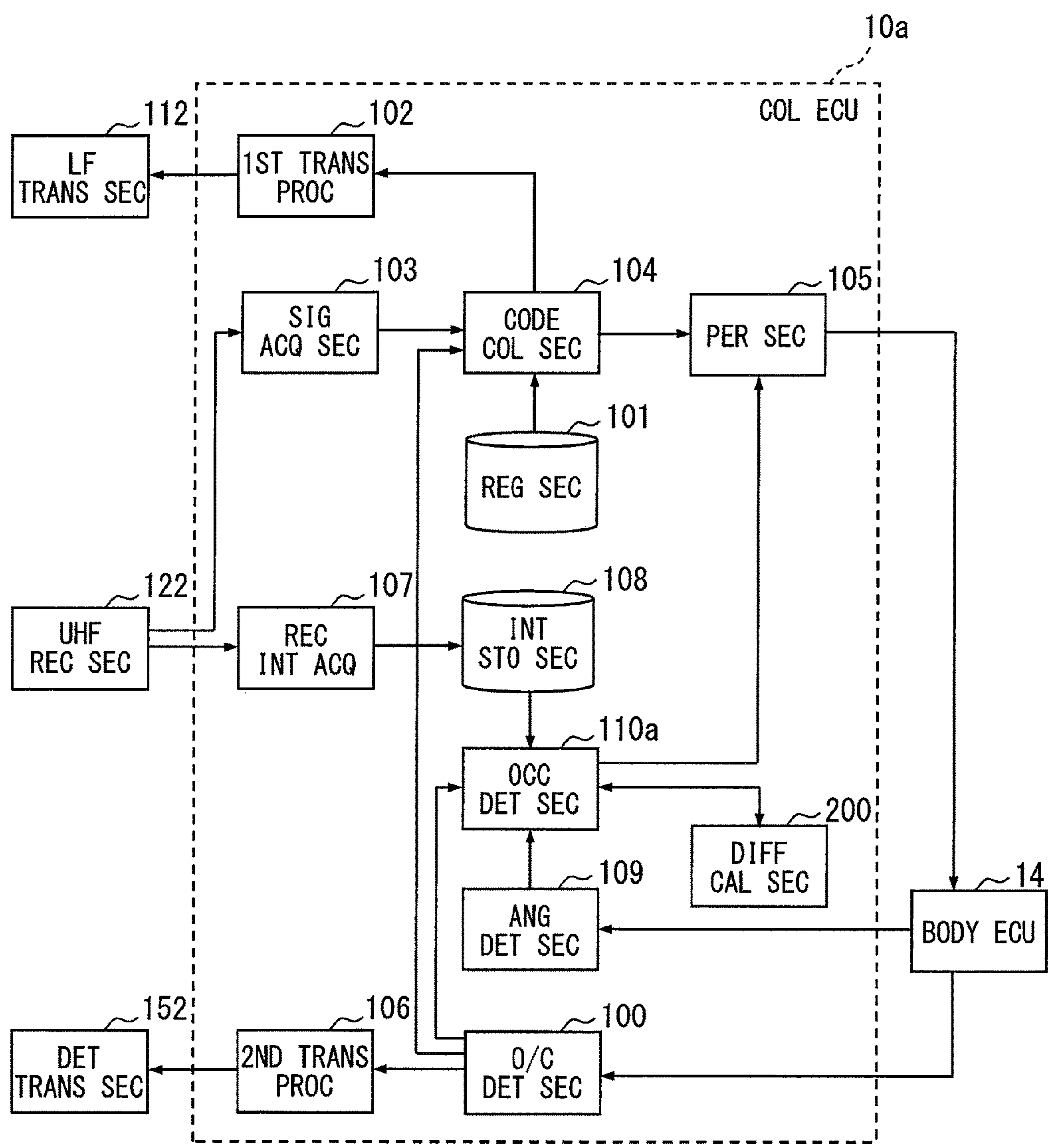
FIG. 7 is a view showing an example of a schematic configuration of a collation ECU according to a fourth embodiment of the present disclosure.

The collation ECU **10*a* will now be described with reference to FIG. 7. As is shown in FIG. 7, the collation ECU (COL ECU) 10*a* includes an opening and closing detection section (O/C DET SEC) 100, a registration section (REG SEC) 101, a first transmission processing section (1ST TRANS PROC) 102, a signal acquisition section (SIG ACQ SEC) 103, a code collation section (CODE COL SEC) 104, an permission section (PER SEC) 105, a second transmission processing section (2ND TRANS SEC) 106, a reception intensity acquisition section (REC INT ACQ) 107, an intensity storage section (INT STO SEC) 108, an angle detection section (ANG DET SEC) 109, an occupant detection section (OCC DET SEC) 110*a*, and a differential calculation section (DIFF CAL SEC) 200. The collation ECU 10*a* is same as the collation ECU 10 of the first embodiment above except that the differential calculation section 200 is additionally included and that the occupant detection section 110*a* is included instead of the occupant detection section 110. The collation ECU 10*a* also corresponds to the occupant detection device. The occupant detection section 110*a*** also corresponds to the occupant detector.

The occupant detection section **110*a* reads out time-series data of the reception intensity during an intended period from the intensity storage section 108 in a same manner as described in any one of the first through third embodiments above. Subsequently, the occupant detection section 110*a* outputs the read time-series data of the reception intensity to the differential calculation section 200. The differential calculation section 200 performs a differential calculation on the time-series data of the reception intensity acquired from the occupant detection section 110*a* and obtains time-series data of a change rate of the reception intensity, which is outputted to the occupant detection section 110*a* from the differential calculation section 200**.

In a case where the time-series data of the change rate of the reception intensity is acquired from the differential calculation section 200, the occupant detection section **110*a* determines an occupant seated adjacent to the right rear seat door or an occupant seated adjacent to the center of the rear seat or both when the change rate of the reception intensity in the received time-series data is less than or equal to a threshold. Meanwhile, the occupant detection section 110*a*** detects neither an occupant seated adjacent to the right rear seat door nor an occupant seated adjacent to the center of the rear seat in the vehicle when the change rate of the reception intensity is above the threshold. The threshold referred to herein can be set to any reasonable value, according to which a change rate of the reception intensity when the detection radio wave passes through a human body and a change rate of the reception intensity when the detection radio wave does not pass through a human body can be distinguished from each other.

A change rate of the reception intensity when the detection radio wave passes through a human body is lower than change rate of the reception intensity when the detection radio wave does not pass through a human body. Even in a case where the change amount of the reception intensity varies little with presence and absence of an occupant, a change rate of the reception intensity readily varies with the presence and the absence of an occupant. Hence, according to the configuration of the fourth embodiment, the presence or absence of an occupant can be detected at a high degree of accuracy even in a case where the presence or absence of an occupant is hard to determine according to the change amount of the reception intensity.

The configuration of the second embodiment or the third embodiment above may be combined with the configuration of the fourth embodiment, and the angle sensor 13 and the angle detection section 109 may be omitted from the vehicle side unit 1 and the collation ECU 10*a*, respectively.

Fifth Embodiment

The above-described embodiments have described the configuration in which the detection radio wave is transmitted from the detection transmitter 15 before the opening and closing detection section 100 detects that the right rear seat door is opened. It should be appreciated, however, that the present disclosure is not limited to the configuration as above. For example, it may be configured that a detection radio wave is transmitted from the detection transmitter 15 after the opening and closing detection section 100 detects that the right rear seat door is opened until the opening and closing detection section 100 detects that the right rear seat door is closed.

Sixth Embodiment

The above-described embodiments have described the configuration to enable a detection of an occupant seated adjacent to the right rear seat door in the vehicle. It should be appreciated, however, that the present disclosure is not limited to the configuration as above. For example, as a sixth embodiment, it may be configured to enable a detection of an occupant seated on a rear seat adjacent to a seat door on a left side (hereinafter, referred to as a left rear seat door) in a vehicle. In the configuration of the sixth embodiment, locations of the detection transmitter 15 and the UHF receiver 12 may be reversed right to left with respect to a front-rear axis of the vehicle. Herein, the angle sensor 13 outputs a signal corresponding to an opening angle of the left rear seat door to the body ECU 14.

Seventh Embodiment

As a seventh embodiment, it may be configured to enable a detection of both an occupant seated adjacent to a right rear seat door and an occupant seated to adjacent to a left rear seat door in a vehicle. In the seventh embodiment, a transmitter and a receiver same as a detection transmitter 15 and a UHF receiver 12 are located symmetrically to the detection transmitter 15 and the UHF receiver 12, respectively, with respect to a front-rear axis of the vehicle. The following will describe an example of the configuration of the seventh embodiment. A vehicular system 4 of the seventh embodiment is same as the vehicular system 4 of the above-described first embodiment except that an occupant detection unit 2*b* is included instead of the occupant detection unit 2 and that two angle sensors 13 respectively output a signal corresponding to an opening angle of the right rear seat door and a signal corresponding to an opening angle of the left rear seat door to a body ECU 14.

Figure 8:
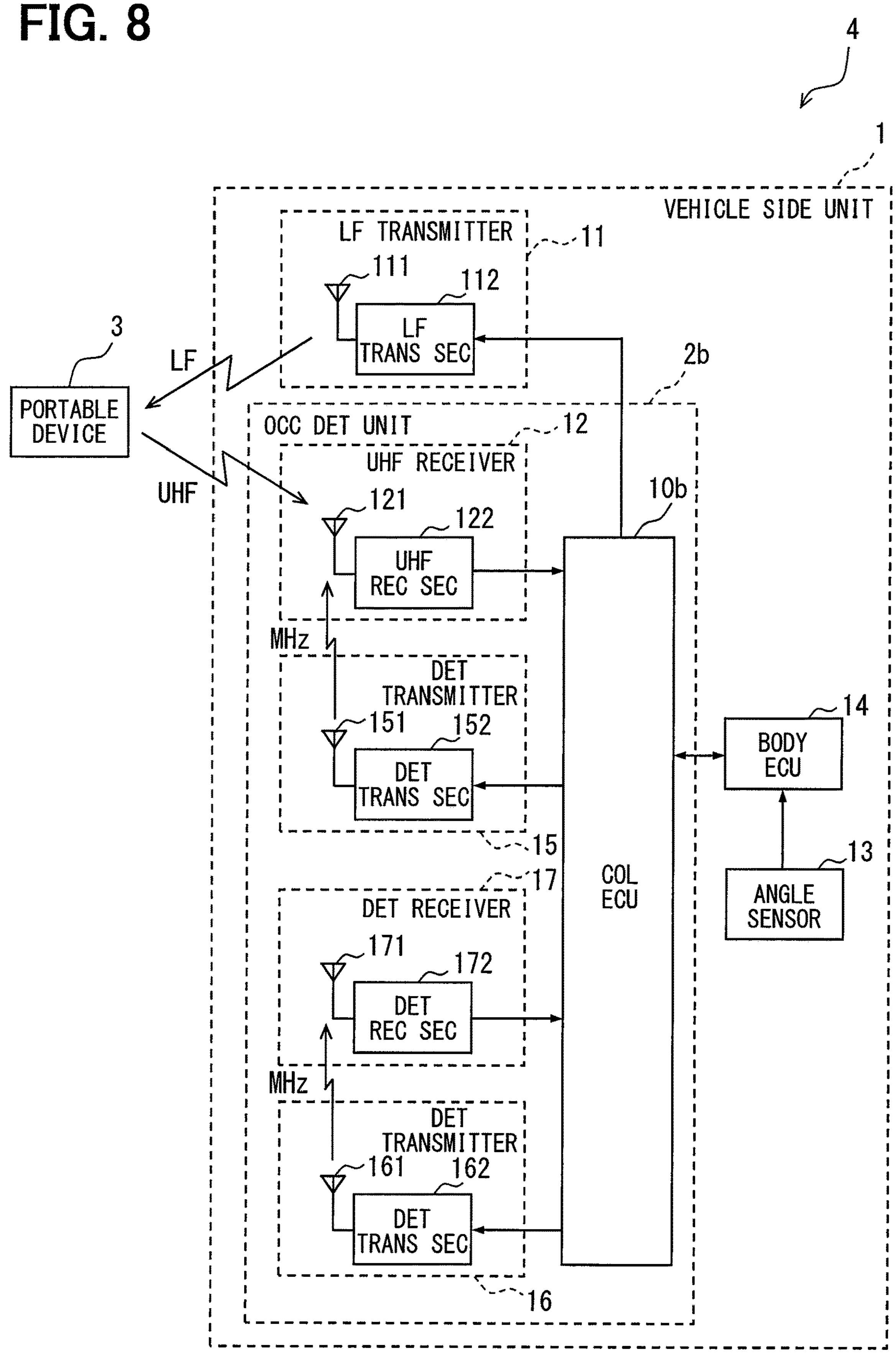
FIG. 8 is a view showing an example of a schematic configuration of a vehicular system according to a seventh embodiment of the present disclosure.

A schematic configuration of the vehicle side unit 1 of the seventh embodiment will be described first with reference to FIG. 8. As is shown in FIG. 8, the vehicle side unit 1 of the seventh embodiment includes a collation ECU (COL ECU) 10*b*, an LF transmitter 11, the UHF receiver 12, two angle sensors 13, the body ECU 14, the detection transmitter (DET TRANSMITTER) 15, another detection transmitter (DET TRANSMITTER) 16, and a detection receiver (DET RECEIVER) 17. In the vehicle side unit 1, the collation ECU 10*b*, the UHF receiver 12, the detection transmitter 15, the detection transmitter 16, and the detection receiver 17 together form the occupant detection unit (OCC DET UNIT) 2*b*. The occupant detection unit 2*b* also corresponds to the occupant detection system.

The detection transmitter 16 includes a detection transmitting antenna 161 and a detection transmitting section 162. The detection transmitting section 162 transmits a detection radio wave in a MHz band via the detection transmitting antenna 161. The detection transmitter 16 also corresponds to the transmitter. A radio wave in the MHz band transmitted from the detection transmitter 16 may be a radio wave in a frequency band equal to or higher than a UHF band, that is, 300 MHz and lower than 1 GHz, or a radio wave in the MHz band other than the range specified above.

The detection receiver 17 includes a detection receiving antenna 171 and a detection receiving section 172. The detection receiving antenna 171 receives a signal transmitted on a radio wave in the MHz band. The detection receiving section 172 is capable of receiving a radio wave in the MHz band transmitted from the detection transmitter 16 via the detection receiving antenna 171. The detection receiving section 172 detects reception intensity of a radio wave received at the detection receiving antenna 171 and outputs a detection result to the collation ECU 10*b*. As with a UHF receiving section 122, the detection receiving section 172 may have and use a known RSSI circuit to detect reception intensity. The detection receiver 17 also corresponds to the receiver.

Figure 9:
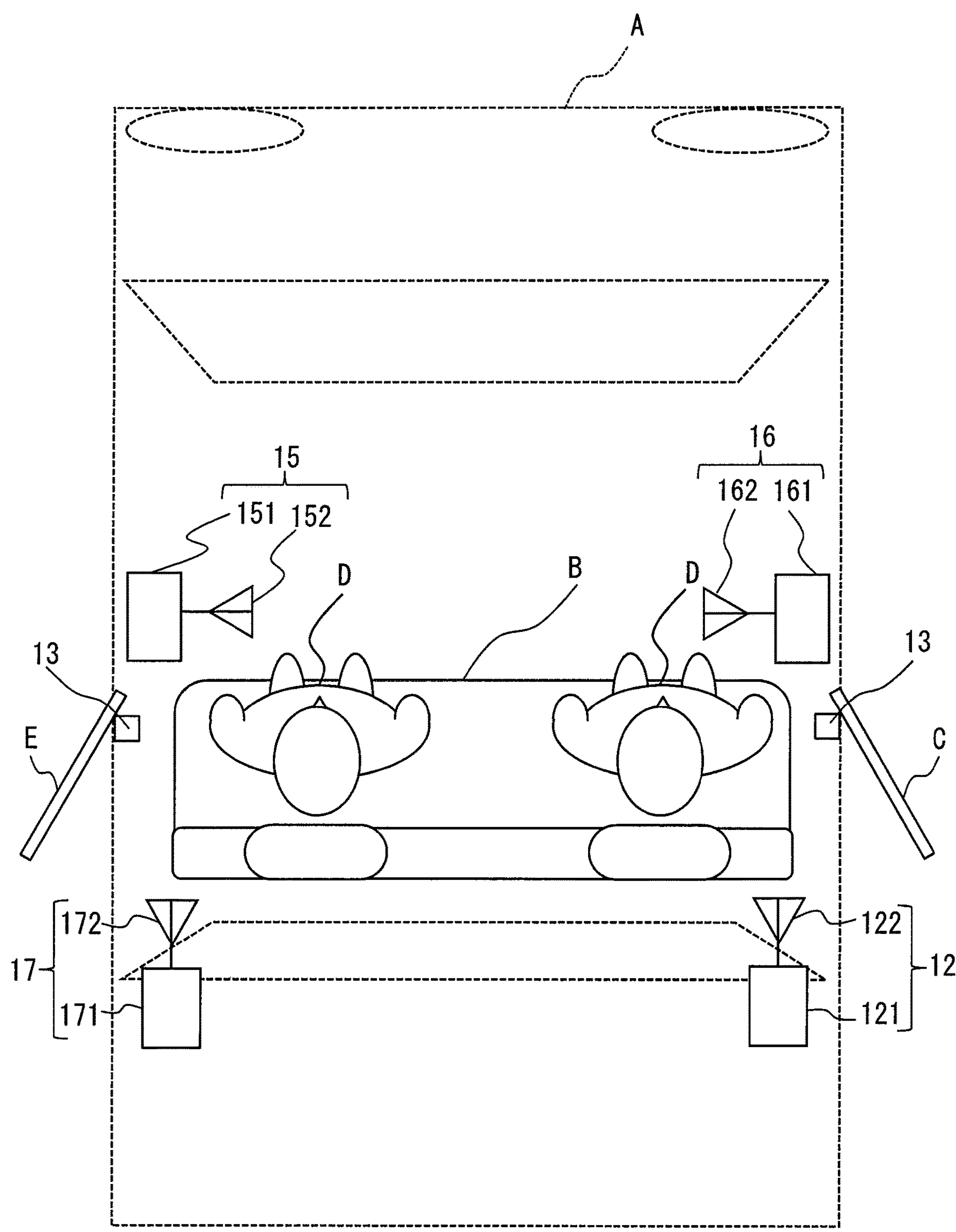
FIG. 9 is a view showing an example of locations of a detection transmitter, a UHF receiver, another detection transmitter, and a detection receiver of the seventh embodiment.

Locations of the detection transmitters 15 and 16, the UHF receiver 12, and the detection receiver 17 will now be described with reference to FIG. 9. An example described in the present embodiment is a configuration to detect an occupant seated on the rear seat in the vehicle. In FIG. 9, a capital A denotes the vehicle, a capital B denotes the rear seat, a capital C denotes the right rear seat door, a capital D denotes an occupant, and a capital E denotes the left rear seat door. As is shown in FIG. 9, locations of the detection transmitter 15 and the UHF receiver 12 are same as the locations described in the first embodiment above.

As is shown in FIG. 9, the detection transmitter 16 is provided adjacent to the right side face of the vehicle A before the rear seat B in the compartment of the vehicle A, in other words, near a B-pillar adjacent to the right side face in the compartment of the vehicle A. For example, the detection transmitter 16 may be provided on a floor adjacent to the right side face between the rear seat B and a driver seat. The detection transmitting antenna 161 of the detection transmitter 16 is provided at least at the location described above. The detection transmitter 16 is provided to transmit a detection radio wave over a range covering the left rear seat door E in a same manner as the detection transmitter 15 transmits a detection radio wave toward the right rear seat door C. One of the right rear seat door and the left rear seat door corresponds to a first seat door and the other corresponds to a second seat door. One of the right side face and the left side face of the vehicle corresponds to a first side face and the other corresponds to a second side face.

As is shown in FIG. 9, the detection receiver 17 is provided adjacent to the left side face of the vehicle A behind the rear seat B in the compartment of the vehicle A, in other words, near a C-pillar adjacent to the left side face in the compartment of the vehicle A. For example, the detection receiver 17 may be provided to the C-pillar adjacent to the left side face. The detection receiving antenna 171 of the detection receiver 17 is provided at least at the location described above. One angle sensor 13 is provided to the right rear seat door and outputs a signal corresponding to an opening angle of the right rear seat door to the body ECU 14. The other angle sensor 13 is provided to the left rear seat door and outputs a signal corresponding to an opening angle of the left rear seat door to the body ECU 14.

Figure 10:
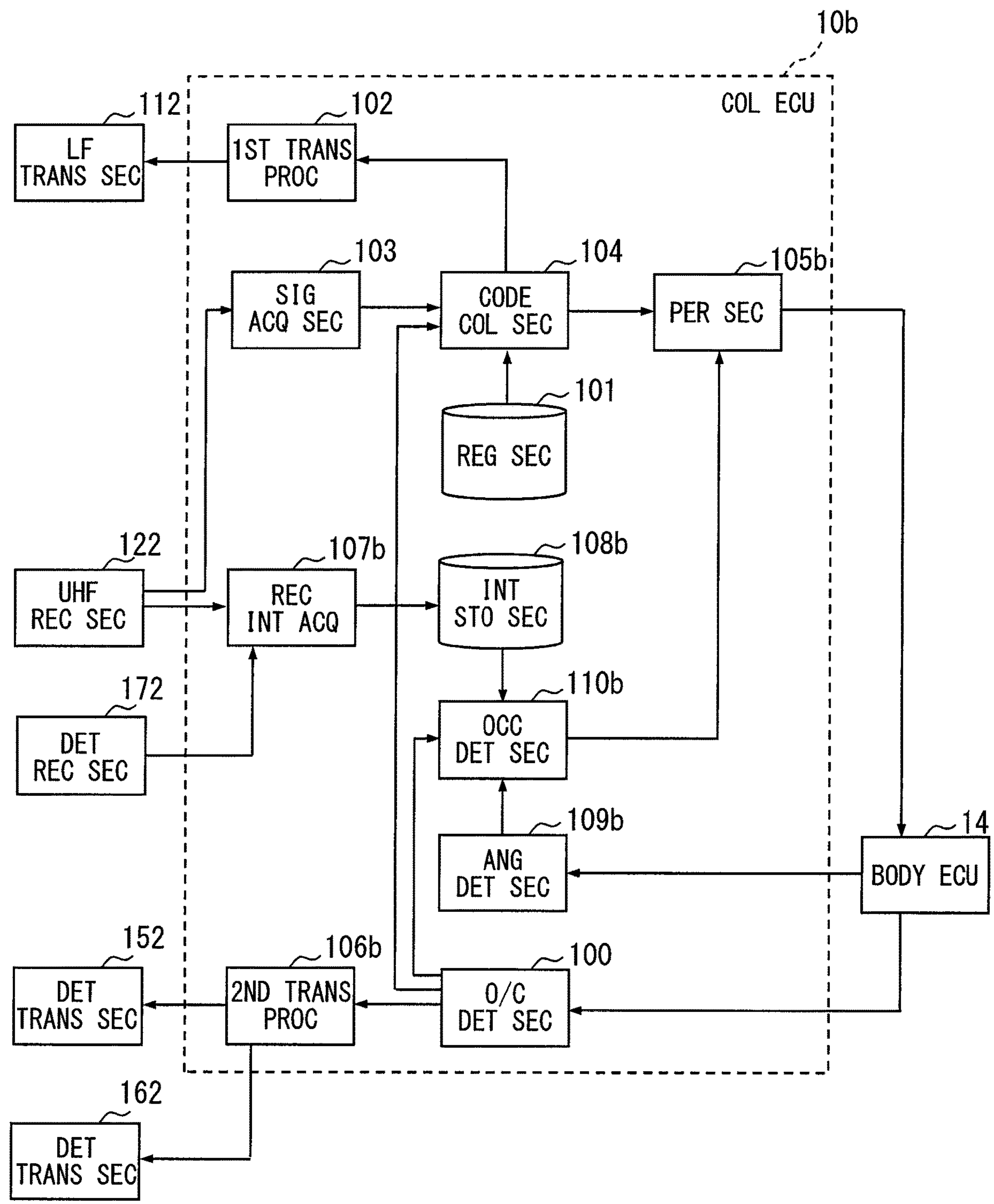
FIG. 10 is a view showing an example of a schematic configuration of a collation ECU according to the seventh embodiment.

A schematic configuration of the collation ECU 10*b* will now be described with reference to FIG. 10. As is shown in FIG. 10, the collation ECU (COL ECU) 10*b* includes an opening and closing detection section (O/C DET SEC) 100, a registration section (REG SEC) 101, a first transmission processing section (1ST TRANS PRO) 102, a signal acquisition section (SIG ACQ SEC) 103, a code collation section (CODE COL SEC) 104, an permission section (PER SEC) 105*b*, a second transmission processing section (2ND TRANS PROC) 106*b*, a reception intensity acquisition section (REC INT ACQ) 107*b*, an intensity storage section (INT STO SEC) 108*b*, an angle detection section (ANG DET SEC) 109*b*, and an occupant detection section (OCC DET SEC) 110*b*. The collation ECU 10*b* is same as the collation ECU 10 of the first embodiment above except that the permission section 105*b*, the second transmission processing section 106*b*, the reception intensity acquisition section 107*b*, the intensity storage section 108*b*, the angle detection section 109*b*, and the occupant detection section 110*b* are included instead of the permission section 105, the second transmission processing section 106, the reception intensity acquisition section 107, the intensity storage section 108, the angle detection section 109, and the occupant detection section 110, respectively. The collation ECU 10*b* also corresponds to the occupant detection device. The reception intensity acquisition section 107*b* also corresponds to the reception intensity acquirer. The occupant detection section 110*b* also corresponds to the occupant detector. The angle detection section 109*b* also corresponds to the angle detector.

The second transmission processing section 106*b* controls the detection transmitter 15 and the detection transmitter 16 to start transmission of the detection radio wave by transmitting a command to the detection transmitting section 152 and the detection transmitting section 162. The detection radio wave may be transmitted at regular intervals, for example, in every 100 milliseconds. The second transmission processing section 106*b* also corresponds to the transmission direction section. The detection transmitter 15 and the detection transmitter 16 may transmit the detection radio wave at same transmission timing or different transmission timing. The second transmission processing section 106*b* may start transmission of the detection radio wave at same timing as the second transmission processing section 106.

The reception intensity acquisition section 107*b* is same as the reception intensity acquisition section 107 of the first embodiment above except that the reception intensity of the radio wave received at the detection receiving antenna 171 is also successively acquired. The reception intensity acquisition section 107*b* stores the reception intensity of the radio wave successively received at the UHF receiving antenna 121 and the reception intensity of the radio wave successively received at the detection receiving antenna 171 into the intensity storage section 108*b* in time series in a distinguishable manner. The intensity storage section 108*b* is same as the intensity storage section 108 of the first embodiment above except that time-series data of the reception intensity of the radio wave received at the detection receiving antenna 171 is also stored. The angle detection section 109 successively detects an opening angle of the right rear seat door and an opening angle of the left rear seat door.

The occupant detection section 110*b* is same as the occupant detection section 110 of the first embodiment above except that an occupant in the vehicle is detected also according to the reception intensity of the detection radio wave received by the detection receiver 17. The occupant detection section 110*b* detects an occupant seated adjacent to the right rear seat door or an occupant seated adjacent to the center of the rear seat in the vehicle or both according to the reception intensity of the detection radio wave received by the UHF receiver 12. In a same manner, the occupant detection section 110*b* also detects an occupant seated adjacent to the left rear seat door or an occupant seated adjacent to the center of the rear seat or both according to reception intensity of the detection radio wave received by the detection receiver 17. A detection result of the occupant detection section 110*b* is outputted to the permission section 105*b*. Even when the code collation is successful, the permission section 105*b* does not permit to lock respective vehicle doors in a case where an occupant seated on the rear seat in the vehicle is detected by the occupant detection section 110*b*.

According to the configuration of the seventh embodiment, both of an occupant seated adjacent to the right rear seat door and an occupant seated adjacent to the left rear seat door in the vehicle can be detected at a higher detection ratio. In a case where a pair of receivers used in a smart function is provided symmetrically in the vehicle, the receivers used in the smart function may be used as the detection receiver 17.

Eighth Embodiment

The above-described embodiments have described the configuration to enable a detection of an occupant seated on the rear seat in the vehicle. It should be appreciated, however, that the present disclosure is not limited to the configuration as above. An occupant seated on a driver seat or a front passenger seat or an occupant seated on a second- or third-row seat in a three-row vehicle may be detected by diagonally sandwiching a seat other than the rear seat between a detection transmitter 15 and a UHF receiver 12 by placing one before and the other behind the seat.

Ninth Embodiment

The above-described embodiments have described the configuration in which a receiver used in the smart function is used as the UHF receiver 12 to receive a detection radio wave. It should be appreciated, however, that the present disclosure is not limited to the configuration as above. For example, instead of using a receiver used in the smart function as a UHF receiver 12 to receive a detection radio wave, the UHF receiver 12 may be provided separately from the receiver used in the smart function.

Tenth Embodiment

The above-described embodiments have described the configuration in which the radio wave in the MHz band equal to or higher than 300 MHz and lower than 1 GHz is used as the detection radio wave. It should be appreciated, however, that the present disclosure is not limited to the configuration as above. In a case where a receiver used in a smart function is not used as the UHF receiver 12 to receive the detection radio wave, a radio wave in the MHz band equal to or higher than 300 MHz and lower than 1 GHz may be used. Alternatively, a radio wave in a GHz band may be used by using, for example, a radio wave at 1 GHz.

The flowcharts or processing in the flowcharts described herein are formed of multiple sections (or referred to as steps). Each section is called, for example, S1. Further, each section may be divided into multiple sub-sections or conversely two or more sections may be combined to one section. The respective sections formed as above may be referred to as circuits, devices, modules, or means.

Each or a combination of the multiple sections can be realized not only by (i) a software section combined with a hardware unit (for example, a computer) but also (ii) a hardware section (for example, integrated circuit or a hard-wired logic circuit) with or without a function furnished to a related device. Further, the hardware section can be provided inside a microcomputer.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

What is claimed is:

1. An occupant detection system to be used in a vehicle, comprising:

a transmitter to be provided adjacent to a first side face of the vehicle before a predetermined seat of the vehicle, and configured to successively transmit a radio wave over a range covering a seat door located on a second side face of the vehicle and in a same row as the predetermined seat, the first side face being one of a right side face or a left side face of the vehicle, and the second side face being the other of the right side face or the left side face of the vehicle;

a receiver to be provided adjacent to the second side face behind the predetermined seat and configured to successively receive the radio wave transmitted from the transmitter; and an occupant detection device including a reception intensity acquirer configured to successively acquire a reception intensity of the radio wave successively received by the receiver, an occupant detector configured to detect an occupant in the vehicle according to the reception intensity acquired by the reception intensity acquirer, and an opening and closing detector configured to detect opening and closing of the seat door, wherein the occupant detector is configured to detect the occupant in the vehicle according to the reception intensity of the radio wave acquired by the reception intensity acquirer while the opening and closing detector detects that the seat door is open.

2. The occupant detection system according to claim 1, wherein the occupant detector is configured to detect the occupant in the vehicle when a change amount of the reception intensity of the radio wave successively received by the reception intensity acquirer while the opening and closing detector detects that the seat door is open is equal to or less than a threshold.

3. The occupant detection system according to claim 1, wherein the occupant detector is configured to detect the occupant in the vehicle when a change rate of the reception intensity of the radio wave successively received by the reception intensity acquirer while the opening and closing detector detects that the seat door is open is equal to or less than a threshold.

4. The occupant detection system according to claim 1, further comprising an angle detector configured to detect an opening angle of the seat door, wherein the occupant detector is configured to detect the occupant in the vehicle according to the reception intensity acquired while the opening angle of the seat door detected by the angle detector is within a predetermined angle and is decreasing.

5. The occupant detection system according to claim 4, wherein the occupant detector is configured to detect the occupant in the vehicle according to the reception intensity acquired while the opening angle of the seat door detected by the angle detector is within 30 degrees and is decreasing.

6. The occupant detection system according to claim 1, wherein the occupant detector is configured to detect the occupant in the vehicle according to the reception intensity of the radio wave acquired from a predetermined time before the opening and closing detector detects that the seat door opened once is closed.

7. The occupant detection system according to claim 6, wherein the occupant detector is configured to detect the occupant in the vehicle according to the reception intensity of the radio wave acquired from 0.25 seconds before the opening and closing detector detects that the seat door opened once is closed.

8. The occupant detection system according to claim 1, wherein the predetermined seat is a rear seat of the vehicle.

9. The occupant detection system according to claim 1, wherein the receiver is configured to receive a collation code from a portable device used in an electronic key system that permits locking or unlocking a door of the vehicle according to a result of a code collation performed by using the collation code.

10. The occupant detection system according to claim 1, wherein the transmitter provided adjacent to the first side face is a first transmitter and the receiver provided adjacent to the second side face is a first receiver, the occupant detection system further comprising:

a second transmitter to be provided adjacent to the second side face line symmetrically to the first transmitter provided adjacent to the first side face with respect to a front-rear axis of the vehicle, and configured to successively transmit a radio wave over a range covering a seat door located on the first side face and in the same row as the predetermined seat; and a second receiver to be provided adjacent to the first side face line symmetrically to the first receiver provided adjacent to the second side face with respect to the front-rear axis of the vehicle, and configured to receive the radio wave transmitted from the second transmitter provided adjacent to the second side face, wherein the opening and closing detector is configured to detect opening and closing of the seat door located on the first side face and the seat door located on the second side face, and the occupant detector is configured to detect the occupant in the vehicle according to a reception intensity of the radio wave received by the second receiver provided adjacent to the first side face while the opening and closing detector detects that the seat door located on the first side face is open, and is configured to detect the occupant in the vehicle according to the reception intensity of the radio wave received by the first receiver provided adjacent to the second side face while the opening and closing detector detects that the seat door located on the second side face is open.

11. An occupant detection device to be used in a vehicle, comprising:

a transmission direction section configured to direct a transmitter provided adjacent to a first side face of the vehicle before a predetermined seat of the vehicle to successively transmit a radio wave to a seat door located on a second side face of the vehicle and in a same row as the predetermined seat, the first side face being one of a right side face or a left side face of the vehicle, and the second side face being the other of the right side face or the left side face of the vehicle;

a reception intensity acquisition section configured to successively acquire a reception intensity of the radio wave successively received by a receiver provided adjacent to the second side face behind the predetermined seat;

an opening and closing detection section configured to detect opening and closing of the seat door; and an occupant detection section configured to detect an occupant in the vehicle according to the reception intensity acquired by the reception intensity acquisition section, wherein the occupant detection section is configured to detect the occupant in the vehicle according to the reception intensity of the radio wave acquired by the reception intensity acquisition section while the opening and closing detection section detects that the seat door is open.

12. An occupant detection device to be used in a vehicle, comprising an electronic control unit configured to:

direct a transmitter provided adjacent to a first side face of the vehicle before a predetermined seat of the vehicle to successively transmit a radio wave to a seat door located on a second side face of the vehicle and in a same row as the predetermined seat, the first side face being one of a right side face or a left side face of the vehicle, and the second side face being the other of the right side face or the left side face of the vehicle;

successively acquire a reception intensity of the radio wave successively received by a receiver provided adjacent to the second side face behind the predetermined seat;

detect opening and closing of the seat door; and detect an occupant in the vehicle according to the reception intensity of the radio wave acquired while detecting that the seat door is open.

* * * * *